(12) United States Patent
Dunlap et al.

(10) Patent No.: US 7,000,512 B2
(45) Date of Patent: Feb. 21, 2006

(54) BLOW MOLDING TRIMMING

(75) Inventors: Richard L. Dunlap, Cairo, OH (US); Edward L. Sanford, Lima, OH (US); Richard C. Darr, Seville, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 315 days.

(21) Appl. No.: 10/304,921

(22) Filed: Nov. 26, 2002

(65) Prior Publication Data

US 2004/0099109 A1 May 27, 2004

(51) Int. Cl.
*B26D 1/26* (2006.01)
*B26D 7/01* (2006.01)
*B26D 7/02* (2006.01)
*B26D 7/18* (2006.01)
*B26D 7/26* (2006.01)

(52) U.S. Cl. ............... 83/23; 83/54; 83/78; 83/451; 83/455; 83/465; 83/582; 83/745; 83/824; 83/946; 82/47; 82/70.2; 82/76

(58) Field of Classification Search ............... 83/23, 83/54, 78, 151, 451, 452, 454, 455, 456, 83/465, 582, 586, 596, 743, 744, 745, 821, 83/824, 825, 862, 914, 946; 30/92, 93, 94, 30/95, 96, 97, 101, 102; 82/1.11, 47, 70.2, 82/76; 264/536, 532; 425/527
See application file for complete search history.

(56) References Cited

U.S. PATENT DOCUMENTS

| | | | | |
|---|---|---|---|---|
| 1,055,970 A | * | 3/1913 | Erickson | 30/95 |
| 2,752,970 A | | 7/1956 | Tupper | |
| 3,091,145 A | * | 5/1963 | Manganelli | 83/452 X |
| 3,520,010 A | * | 7/1970 | Dockery | 264/536 X |
| 3,608,406 A | * | 9/1971 | Paysinger et al. | 82/1.11 |
| 3,823,626 A | * | 7/1974 | Bakewell | 82/1.11 |
| 3,888,146 A | * | 6/1975 | Tomenceak | 82/1.11 |
| 4,368,827 A | | 1/1983 | Thompson | |
| 5,160,340 A | * | 11/1992 | Gary et al. | 30/101 X |
| 5,167,968 A | | 12/1992 | Dunlap et al. | |
| 6,367,360 B1 | | 4/2002 | Dunlap et al. | |

* cited by examiner

Primary Examiner—Clark F. Dexter
(74) Attorney, Agent, or Firm—Brooks Kushman P.C.

(57) ABSTRACT

A blow molded container (10) having a trimmed nonround opening (12) is blow molded from a preform (36) and then positioned by a positioner (50) of a nonround trimmer (16) that includes a rotary driven arm assembly (56) having a knife holder (60). A guide (66) guides the knife holder (60) in a nonround path to perform the trimming.

21 Claims, 3 Drawing Sheets

BLOW MOLDING TRIMMING

BACKGROUND OF THE INVENTION

1. Field of the Invention

This invention relates to a trimmer for nonround trimming of a blow molded container, to a method for nonround blow molded container trimming, to a method for making a blow molded container with a nonround opening, and to a blow molded container having a trimmed nonround opening.

2. Background Art

In certain blow molding applications, it is desirable to provide post blow molding trimming of the container to remove a scrap piece. Most often, this has been done on extruded blow molded containers to remove blow heads and provide round dispensing openings that usually have a thread or other retainer for securing a closure cap. Such trimmers are disclosed by U.S. Pat. No. 5,167,968 Dunlap et al. and U.S. Pat. No. 6,367,360 Dunlap et al., both of which are assigned to the assignee of the present application.

SUMMARY OF THE INVENTION

One object of the present invention is to provide an improved blow molding trimmer.

In carrying out the above object, a trimmer in accordance with the invention is operable for nonround trimming of a blow molded container of the type made from an injection molded preform having an open end adjacent which the preform is held during blow molding thereof to include a nonround portion to be trimmed at a trimming plane. The trimmer includes a positioner for holding the container to position the nonround portion thereof for trimming. A rotary actuator of the trimmer rotates around a rotary axis extending perpendicular to the trimming plane of the container as it is held by the positioner. A knife holder arm assembly of the trimmer is pivotally supported by the rotary actuator about an arm axis spaced from the rotary axis, and the arm assembly includes a knife holder supported by the arm assembly to hold a knife for trimming the container. A biaser of the trimmer biases the arm assembly so the knife holder is biased toward the rotary axis during rotation of the rotary actuator. The trimmer also includes a guide for engaging the knife holder under the impetus of the biaser during rotation of the rotary actuator so the knife held thereby moves in a nonround path to cut through the nonround portion of the container and thereby trim a scrap piece from the container.

The biaser includes a spring that biases the knife holder arm assembly so the knife holder is biased toward the rotary axis. A pivotal connection pivotally supports the knife holder on the arm assembly, and the knife holder includes at least one roller that rolls along the guide during the cutting. Best results are achieved when the knife holder includes a pair of the rollers that roll along the guide during the cutting.

In one embodiment, the arm assembly includes an arm pivotally supported on the rotary actuator, a spring that biases the arm, a pivotal connection that supports the knife holder on the arm, and a pair of rollers on the knife holder that roll along the guide during the cutting.

In another embodiment, the arm assembly includes a first arm pivotally supported on the rotary actuator, a first biasing spring that biases the first arm about the rotary actuator, a second arm pivotally supported on the first arm, a second biasing spring that biases the second arm about the first arm, a pivotal connection that supports the knife holder on the second arm, and a pair of rollers on the knife holder that roll along the guide during the cutting.

In one embodiment of the positioner, a positioner member has a nonround opening through which the container is inserted to position the container adjacent its nonround portion at which the trimming takes place, while another embodiment of the positioner includes a pair of clamp members that are movable toward each other to clamp the container adjacent its nonround portion at which the trimming takes place. In each of these embodiments, the guide that guides the knife holder is located on the positioner.

A scrap holder of the trimmer holds the scrap piece upon trimming thereof from the container.

Another object of the invention is to provide an improved blow molding trimming method.

In carrying out the immediately preceding object, the blow molding trimming method of the invention provides trimming of a nonround blow molded container of the type made from an injection molded preform having an open end adjacent which the preform is held during blow molding thereof to include a nonround portion to be trimmed at a trimming plane. The method is performed by positioning the container so the nonround portion thereof is accessible for the trimming, and by rotating a rotary actuator about a rotary axis that extends perpendicular to the trimming plane of the container as it is held by the positioner. The method also involves pivotally supporting a knife holder arm assembly and a knife held thereby on the rotary actuator about an arm axis spaced from the rotary axis, and by biasing the knife holder arm assembly so the knife held thereby is biased toward the rotary axis during rotation of the rotary actuator. Guiding of the knife holder arm assembly under the impetus of the biaser during the rotation of the rotary actuator moves the knife held by the arm assembly in a nonround path to cut through the nonround portion of the container and thereby trim a scrap piece from the container.

In one practice of the blow molding trimming method, the container is inserted through a nonround opening of the positioner to position the container adjacent its nonround portion at which the trimming takes place.

In another practice of the blow molding trimming method, the container is clamped between a pair of clamp members of the positioner adjacent its nonround portion at which the trimming takes place.

The blow molding trimming method is performed by spring biasing the knife holder arm assembly so as to bias the knife held thereby toward the rotary axis. Furthermore, the knife holder arm assembly is guided against the bias toward the rotary axis by a guide located on the positioner, and rollers on the knife holder roll against the guide to guide the knife holder during the trimming. In addition, the trimming is performed while a scrap holder holds the scrap piece that is trimmed from the container, and the knife trims within a cutting groove of the blow molded container.

Another object of the present invention is to provide an improved method for making a blow molded container.

The method for making a blow molded container in accordance with the immediately preceding object is performed by holding an injection molded preform adjacent an open end thereof for blow molding to provide a container having a nonround portion and by subsequently trimming the container at the nonround portion thereof to provide a nonround opening.

The method for making the blow molded container is performed by holding a scrap piece as it is trimmed from the container, and the trimming is performed within a cutting groove of the container.

Another object of the present invention is to provide an improved blow molded container.

In carrying out the immediately preceding object, the improved blow molded container of the invention is of the type made from an injection molded preform having an open end adjacent which the preform is held during blow molding thereof to include a nonround portion, and the container includes a nonround opening having a trimmed edge at the nonround portion of the container.

The blow molded container of the invention is made of polyethylene terephthalate which, although difficult to trim, can be trimmed with the nonround shape by the trimmer and trimming method of the invention utilized to perform the method for making the blow molded container.

The objects, features and advantages of the present invention are readily apparent from the following detailed description of the preferred embodiments when taken in connection with the accompanying drawings.

DETAILED DESCRIPTION OF THE PREFERRED EMBODIMENTS

Figure 1:
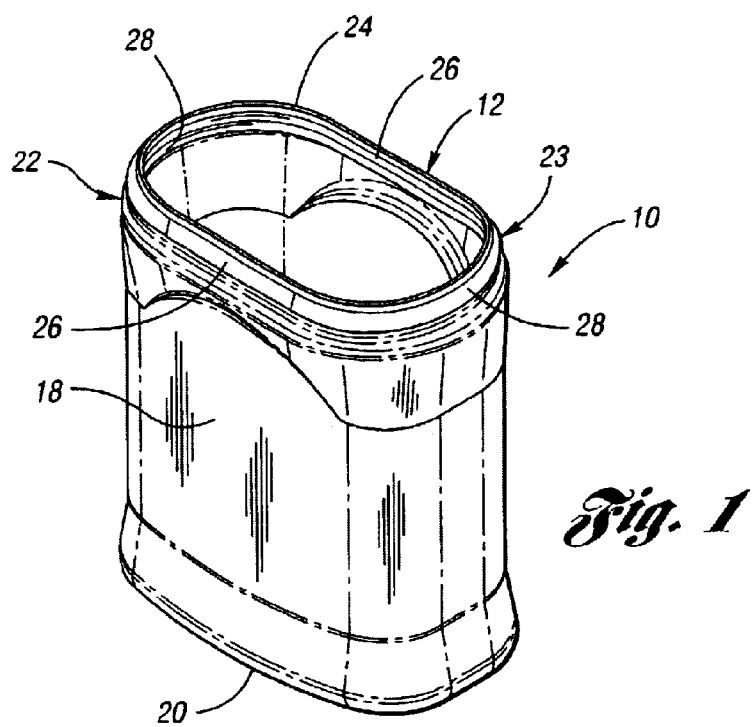
FIG. 1 is a perspective view of a blow molded container constructed in accordance with the present invention with a trimmed nonround opening.

With reference to FIG. 1 of the drawings, a blow molded container constructed in accordance with the invention is generally indicated by 10 and has a trimmed nonround opening 12 as is hereinafter more fully described.

Figure 2:
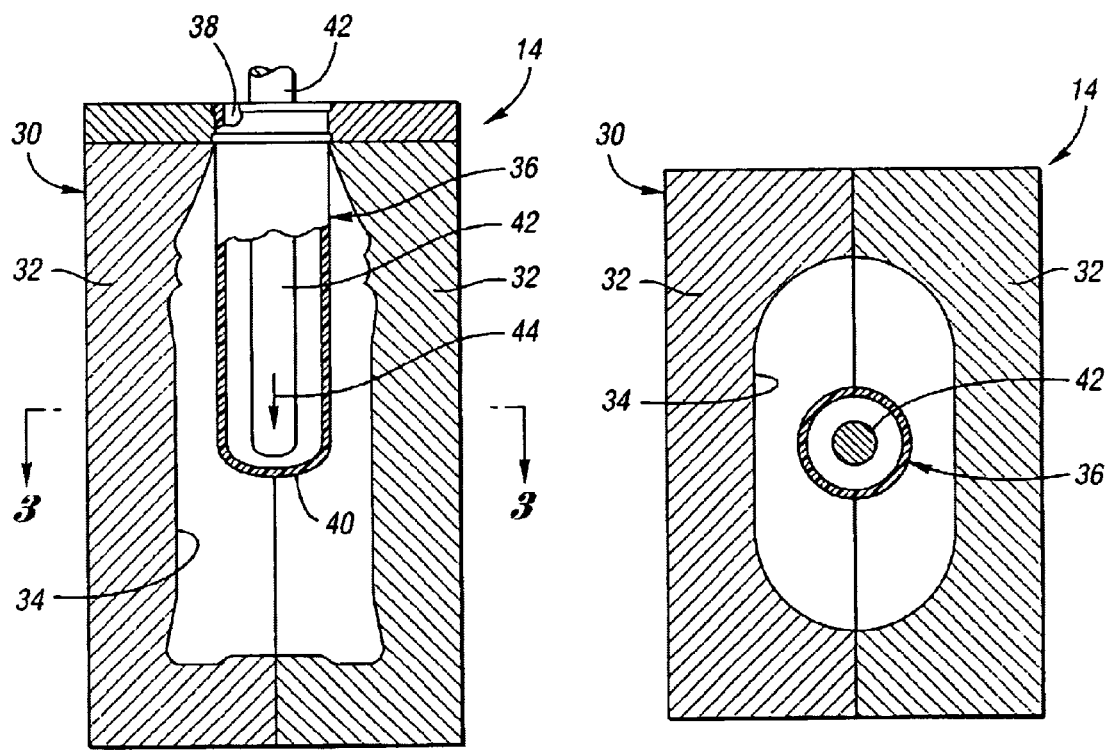
FIG. 2 is a sectional view taken through a mold in which an injection molded preform is blow molded to provide a container which is subsequently trimmed in accordance with the invention.
Figure 3:
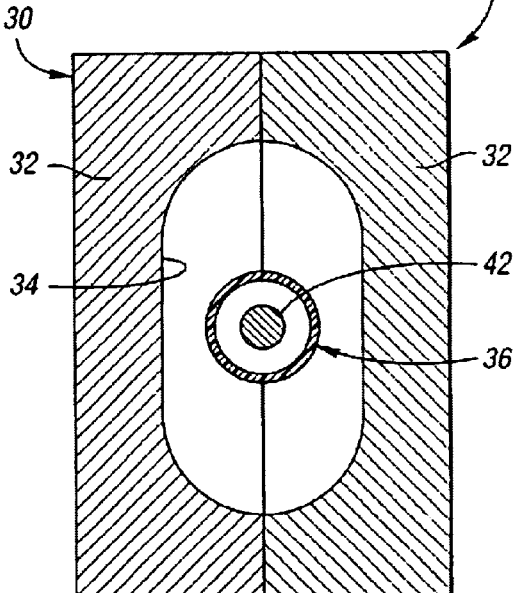
FIG. 3 is a sectional view through the mold and preform taken along the direction of line 3—3 in FIG. 2.

This container 10 is made by blow molding apparatus 14 illustrated in FIGS. 2 and 3 and by a trimmer 16 that is illustrated in FIGS. 4–9 and performs a trimming method of the invention. The construction of the blow molded container 10, the method for making the blow molded container, the trimmer 16 and the trimming method of the invention will all be described in an integrated manner in order to facilitate an understanding of all aspects of the invention.

With continuing reference to FIG. 1, the container 10 is blow molded with a nonround shape as illustrated and includes a body portion 18, a lower closed end 20 and an upper open end 22 having a nonround portion 23 which defines the nonround opening 12 previously mentioned. This nonround opening 12 has a trimmed edge 24 that is provided by the trimmer and trimming method during the blow molded container making operation more fully hereinafter described. As specifically illustrated, the nonround opening 12 has straight sides 26 and semicircular ends 28. However, it should be appreciated that other nonround shapes that are not circular can also be provided in accordance with the invention. Also, the container 10 is made from polyethylene terephthalate which is more difficult to trim than other plastics but can be done in accordance with the invention. The trimming method however is also applicable to other plastics even though it has particular utility when utilized with blow molded polyethylene terephthalate containers.

With reference to FIGS. 2 and 3, the blow molding apparatus 14 includes a mold 30 having mold portions 32 that are movable toward each other to define a blow molding cavity 34 and to also enclose an injection molded preform 36 that is heated either from residual heat of the injection molding of the preform or by a post injection molding heating step. The injection molded preform 36 has an upper open end 38 adjacent which the preform is held during the blow molding by the closed mold 30 and extends downwardly within the mold cavity 34 less than the entire height of the cavity to its lower closed end 40. Upon insertion into the mold, a stretch rod 42 is inserted downwardly to the lower closed end of the preform and is movable as shown by arrow 44 as the blow molding is performed to axially stretch the preform and thereby provide biaxial orientation of the blow molded container. However, it should also be appreciated that the invention has applicability to nonstretched preforms where the additional strength added by biaxial orientation is not required.

After the blow molding within the mold 30 illustrated in FIGS. 2 and 3, the initial blow molded container 10₁ has the shape illustrated in FIG. 4 including the lower container 10 that eventually results as was previously described in FIG. 1 as well as having the upper scrap piece 10ₛ that is trimmed by the trimmer 16 as is hereinafter more fully described. This trimming takes place at the container nonround portion 23 along a trimming plane 46 that extends perpendicular to a rotary axis A of the trimmer 16. More specifically, this trimming is performed within a trimming groove 48 shown in FIG. 5 such that the trimming plane 46 and trimming groove 48 are located between the lower blow molded container 10 and the upper scrap piece 10ₛ.

Figure 4:
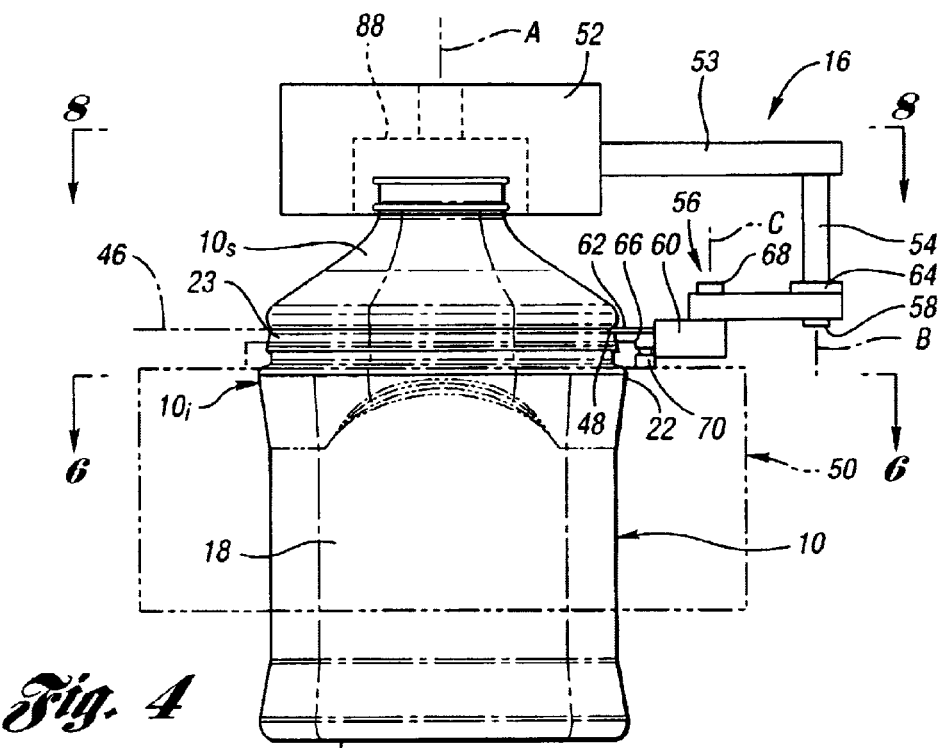
FIG. 4 is an elevational view of a trimmer for performing nonround trimming of the blow molded container in accordance with the invention.
Figure 5:
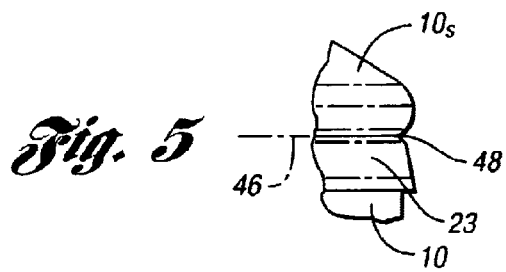
FIG. 5 is an enlarged partial view of FIG. 4 for illustrating a cutting groove at which the nonround trimming is performed.

With continuing reference to FIG. 4, the trimmer 16 includes a positioner 50 for holding the container 10ᵢ so that its nonround portion 23 is accessible for the trimming to be performed. A rotary actuator 52 of the trimmer rotates about the rotary axis A that extends perpendicular to the trimming plane 46 of the container as it is held by the positioner 50. This rotary actuator 52 includes a portion 53 that extends in an outward direction radially from the rotary axis A and has a downwardly projecting support 54 that extends along an arm axis B spaced outwardly from the rotary axis A and extending in a parallel relationship. A knife holder arm assembly 56 is pivotally supported by a pivotal connection 58 on the rotary actuator support 54 about the arm axis B. This arm assembly 56 includes a knife holder 60 for supporting a knife 62 for trimming the container. A biaser provided by a spring 64 biases the arm assembly 56 so the knife holder 60 is biased toward the rotary axis A during rotation of the rotary axis. A guide 66 of the trimmer is engaged by the knife holder 60 under the impetus of the spring biaser 64 during rotation of the rotary actuator so that the knife 62 held thereby moves in a nonround path as illustrated by the positions of the knife holder arm assembly 56ₐ, 56ᵦ, 56ᶜ and 56ᵈ in FIG. 8 as the knife 62 cuts through the nonround portion 23 of the container and thereby trims the scrap piece from the container. During such movement, the arm assembly pivots about the axis B as necessary to properly position the knife holder as it is guided by the guide 66 with the spring biaser 64 ensuring the proper positioning. It has been found that good results are achieved when the angle of the knife cutting edge defines an included angle of less than 45° with the container portion being cut so as to ensure that there is a slicing trimming that provides a smooth trim edge to the container.

Figure 8:
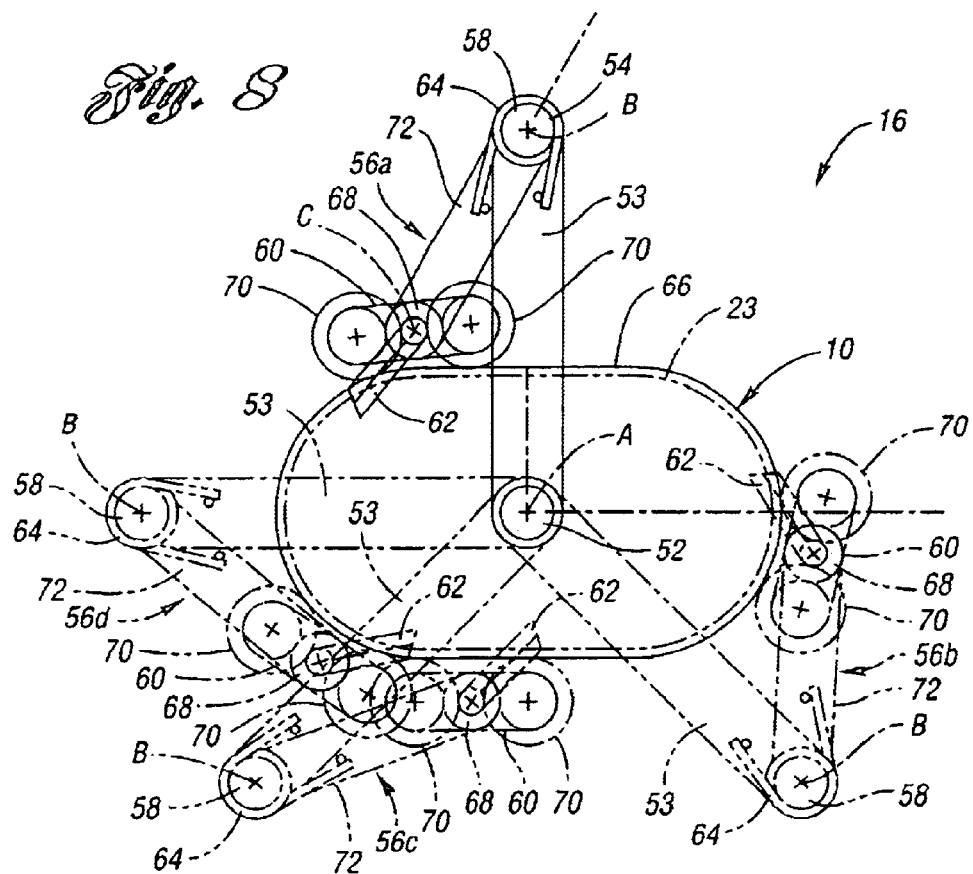
FIG. 8 is a somewhat schematic top plan view taken along the direction of line 8—8 in FIG. 4 and illustrates one embodiment of a knife holder arm assembly of the trimmer shown in different positions as it moves around the container to perform the trimming.

As shown in both FIGS. 4 and 8, the trimmer includes a pivotal connection 68 that pivotally supports the knife holder 60 on the arm assembly 56 about an axis C so that the knife holder can pivotally rotate as necessary with respect to the arm assembly. Furthermore, the knife holder includes at least one roller 70 and actually a pair of the rollers 70 that roll along the guide 66 during the cutting that performs the trimming. The spring biaser 64 biases the arm assembly inwardly so that each roller 70 engages the guide 66 and thereby properly angularly positions the knife 62 with respect to the container nonround portion 23 being trimmed as previously described.

With continuing reference to FIG. 8, the embodiment of the arm assembly 56 illustrated includes an arm 72 having one end supported by the pivotal connection 58 on the rotary actuator portion 53 for pivotal movement about the arm axis D with the biaser spring 64 providing a counterclockwise bias thereabout that biases the knife 62 held by the arm assembly inwardly toward the rotary axis A. The other end of the arm 72 supports the pivotal connection 68 by which the knife holder 60 is supported on the arm assembly with its roller 70 in engagement with the guide 66.

Figure 9:
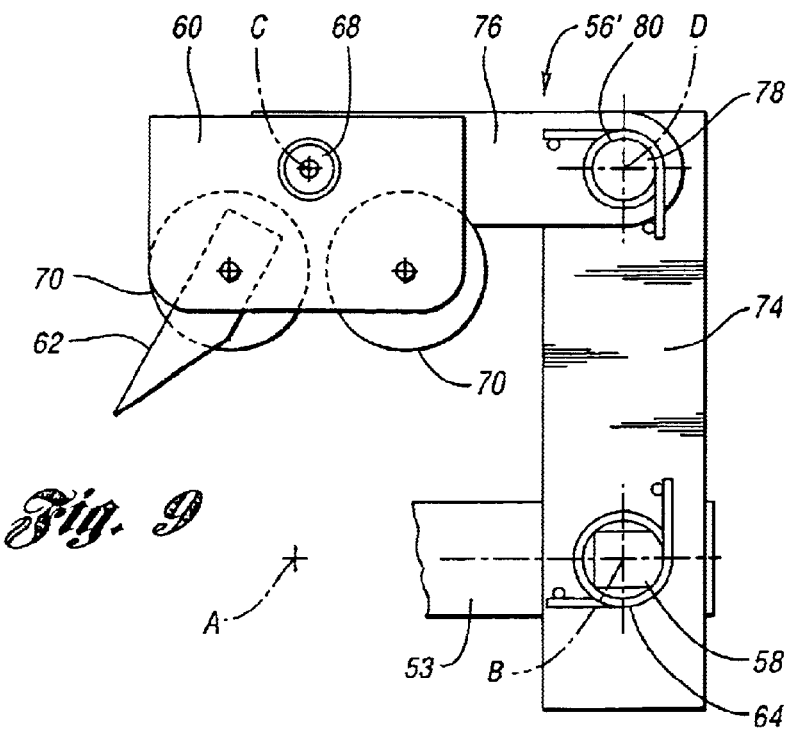
FIG. 9 is a view similar to FIG. 8 showing another embodiment of the arm assembly of the trimmer.

With reference to FIG. 9, another embodiment of the trimmer arm assembly 56' includes a first arm 74 having one end supported by the pivotal connection 58 on the portion 53 of the rotary actuator 58 for pivotal movement about the axis B and a first spring 64 provides biasing thereof in a counterclockwise direction about axis B. A second arm 76 has one end supported by a pivotal connection 78 about an axis D on the other end of the first arm 74 and a second spring 80 provides counterclockwise biasing of the second arm about axis D inwardly toward the central rotary axis A. The other end of the second arm 76 supports the pivotal connection 68 on which the knife holder 60 is supported with the knife 62 supported and guided by the rollers 70 in association with the guide previously described. Provision of the pair of arms 74 and 76 permits the trimming to accommodate nonround shapes of greater elongation with a reduced outward radial space requirement as compared to that required with a single arm as with the embodiment of FIG. 8. More specifically, pivoting of both of the arms 74 and 76 about their associated pivotal connections 58 and 78 with the biaser springs 64 and 80 allows the trimming of nonround shapes with a lesser requirement for radial spacing from the rotary axis A.

Figure 6:
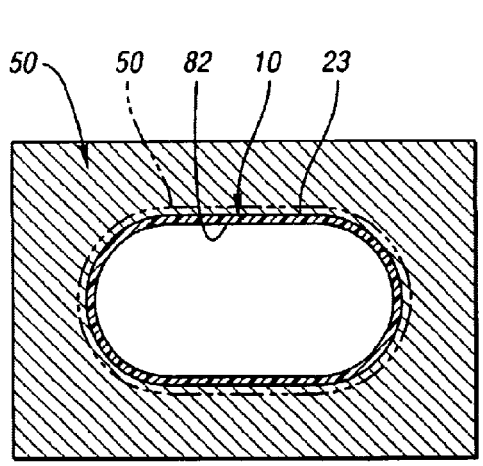
FIG. 6 is a sectional view taken along the direction of line 6—6 in FIG. 4 to illustrate one embodiment of a positioner having a nonround opening in which a nonround portion of the container is positioned during the trimming.

With combined reference to FIGS. 4 and 6, the positioner 50 illustrated has a nonround opening 82 through which the container is inserted to position the container adjacent its nonround portion 23 at which the trimming takes place as previously described. Such positioning of the container together with the trimming performed by cutting through the cutting groove previously described in connection with FIG. 5 with the knife angularly oriented provides a smooth trimmed edge to the resultant container.

Figure 7:
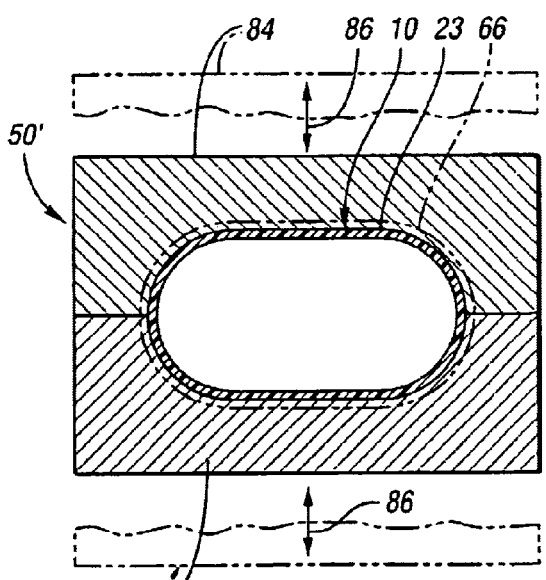
FIG. 7 is a sectional view similar to FIG. 6 of another embodiment wherein the positioner includes a pair of clamp members that position the nonround portion of the container during the trimming.

With reference to FIG. 7, another embodiment of the positioner 50' includes a pair of clamp members 84 that are movable as shown by arrows 86 to clamp and unclamp the nonround container portion 23 in preparation for the trimming.

Each of the embodiments of the positioners 50 and 50' respectively illustrated in FIGS. 6 and 7 has the guide 66 located on the positioner so as to provide the proper path of movement of the knife holder and angular orientation of the knife blade during the trimming operation.

As shown in FIG. 4, the trimmer also includes a scrap holder 88 for holding the scrap piece $10_s$ during the trimming, which allows the scrap piece to be subsequently conveyed to a scrap line or otherwise removed without randomly flying off onto the factory floor. This scrap holder 88 may be embodied by different constructions including a pneumatically inflatable ring that is inserted into the open end of the container, pneumatically actuated fingers that hold the scrap piece to be trimmed either on the inside or outside of its open end, or mechanically actuated fingers that hold the scrap piece to be trimmed likewise either on the inside or outside of its open end.

While the preferred embodiments and ways of practicing the invention have been described in detail, those familiar with the art to which this invention relates will recognize other ways of practicing the invention as defined by the following claims.

What is claimed is:

1. A trimmer for nonround trimming of a blow molded container of the type made from an injection molded preform having an open end adjacent which the preform is held during blow molding thereof to include a nonround portion to be trimmed at a trimming plane, the trimmer comprising:

a positioner for holding the container to position the nonround portion thereof for trimming;

a rotary actuator that rotates about a rotary axis for rotating perpendicular to the trimming plane of the container as it is held by the positioner;

a knife holder arm assembly pivotally supported by the rotary actuator about an arm axis spaced from the rotary axis, and the arm assembly including a knife holder that holds a knife for trimming the container;

a biaser for biasing the arm assembly so the knife holder is biased toward the rotary axis during rotation of the rotary actuator; and a guide for engaging the knife holder under the impetus of the biaser during rotation of the rotary actuator so the knife held thereby moves in a nonround path to cut through the nonround portion of the container and thereby trim a scrap piece from the container.

2. A trimmer as in claim 1 wherein the biaser includes a spring that biases the knife holder arm assembly so the knife holder is biased toward the rotary axis.

3. A trimmer as in claim 1 wherein the knife holder arm assembly further includes a pivotal connection that pivotally supports the knife holder, and the knife holder including at least one roller that rolls along the guide during the cutting.

4. A trimmer as in claim 1 wherein the knife holder arm assembly further includes a pivotal connection that pivotally supports the knife holder and the knife holder including a pair of rollers that roll along the guide during the cutting.

5. A trimmer as in claim 1 wherein the knife holder arm assembly further includes an arm pivotally supported on the rotary actuator, the biaser including a spring that biases the arm, and wherein the knife holder arm assembly further includes a pivotal connection that supports the knife holder on the arm, and the knife holder including a pair of rollers that roll along the guide during the cutting.

6. A trimmer as in claim 1 wherein the knife holder arm assembly further includes a first arm pivotally supported on the rotary actuator, the biaser including a first spring that biases the first arm about the rotary actuator, and wherein the knife holder arm assembly further includes a second arm pivotally supported on the first arm, a second spring that biases the second arm about the first arm, and a pivotal connection that supports the knife holder on the second arm, and the knife holder including a pair of rollers that roll along the guide during the cutting.

7. A trimmer as in claim 1 wherein the positioner includes a nonround opening through which the container is inserted to position the container adjacent its nonround portion at which the trimming takes place.

8. A trimmer as in claim 1 wherein the positioner includes a pair of clamp members that are movable toward each other to clamp the container adjacent its nonround portion at which the trimming takes place.

9. A trimmer as in claim 1 wherein the guide is located on the positioner.

10. A trimmer as in claim 1 further including a scrap holder connected to the rotary actuator for holding the scrap piece upon trimming thereof from the container.

11. A trimmer for nonround trimming of a blow molded container of the type made from an injection molded preform having an open end adjacent which the preform is held during blow molding thereof to include a nonround portion to be trimmed at a trimming plane, the trimmer comprising:
   a positioner for holding the container to position the nonround portion thereof for trimming;
   a rotary actuator that rotates about a rotary axis for rotating perpendicular to the trimming plane of the container as it is held by the positioner;
   a knife holder arm assembly pivotally supported by the rotary actuator about an arm axis spaced from the rotary axis, the arm assembly including a knife holder that holds a knife for trimming the container, and the knife holder including a pair of rollers;
   a spring for biasing the arm assembly so the knife holder is biased toward the rotary axis during rotation of the rotary actuator; and
   a guide on the positioner for engaging the rollers of the knife holder under the impetus of the spring during rotation of the rotary actuator so the knife held thereby moves in a nonround path to cut through the nonround portion of the container and thereby trim a scrap piece from the container.

12. A trimmer for nonround trimming of a blow molded container of the type made from an injection molded preform having an open end adjacent which the preform is held during blow molding thereof to include a nonround portion to be trimmed at a trimming plane, the trimmer comprising:
   a positioner for holding the container to position the nonround portion thereof for trimming;
   a rotary actuator that rotates about a rotary axis for rotating perpendicular to the trimming plane of the container as it is held by the positioner;
   a knife holder arm assembly including a first arm pivotally supported on the rotary actuator, a first spring that biases the first arm about the rotary actuator, and wherein the knife holder arm assembly further includes a second arm pivotally supported on the first arm, a second spring that biases the second arm about the first arm, and a knife holder pivotally supported by the second arm to hold a knife for trimming the container, and the knife holder including a pair of rollers;
   a guide on the positioner for engaging the rollers of the knife holder under the impetus of the springs during rotation of the rotary actuator so the knife held thereby moves in a nonround path to cut through the nonround portion of the container and thereby trim a scrap piece from the container; and
   a scrap holder connected to the rotary actuator for holding the scrap piece upon trimming thereof from the container.

13. A method for trimming a nonround blow molded container of the type made from an injection molded preform having an open end adjacent which the preform is held during blow molding thereof to include a nonround portion to be trimmed at a trimming plane, the trimming method comprising:
   positioning the container using a positioner so the nonround portion thereof is accessible for the trimming;
   rotating a rotary actuator about a rotary axis that extends perpendicular to the trimming plane of the container as it is held by the positioner;
   pivotally supporting a knife holder arm assembly and a knife held thereby on the rotary actuator about an arm axis spaced from the rotary axis;
   biasing the knife holder arm assembly using a biase so the knife held thereby is biased toward the rotary axis during rotation of the rotary actuator; and
   guiding the knife holder arm assembly under the impetus of the biaser during rotation of the rotary actuator so the knife held by the arm assembly moves in a nonround path to cut through the nonround portion of the container and thereby trim a scrap piece from the container.

14. A trimming method as in claim 13 wherein the positioning step includes inserting the container through a nonround opening of the positioner to position the container adjacent its nonround portion at which the trimming takes place.

15. A trimming method as in claim 13 wherein the positing step includes clamping the container between a pair of clamp members of the positioner adjacent its nonround portion at which the trimming takes place.

16. A trimming method as in claim 13 wherein the biaser is a spring to bias the knife toward the rotary axis.

17. A trimming method as in claim 13 wherein the guiding step includes biasing the knife holder arm assembly against a guide located on the positioner.

18. A trimming method as in claim 17 wherein rollers on the knife holder arm assembly roll against the guide to guide the knife holder arm assembly during the trimming.

19. A trimming method as in claim 13 further including using a scrap holder toward the scrap piece that is trimmed from the container.

20. A trimming method as in claim 13 wherein the knife trims within a cutting groove of the blow molded container.

21. A method for trimming a nonround blow molded container of the type made from an injection molded preform having an open end adjacent which the preform is held during blow molding thereof to include a nonround portion to be trimmed at a trimming plane, the trimmer comprising:
   positioning the container using a positioner so the nonround portion thereof is accessible for the trimming;
   rotating a rotary actuator about a rotary axis that extends perpendicular to the trimming plane of the container as it is held by the positioner;
   pivotally supporting a knife holder arm assembly and a knife held thereby on the rotary actuator about an arm axis spaced from the rotary axis;
   spring biasing the knife holder arm assembly so the knife held thereby is biased toward the rotary axis during rotation of the rotary actuator;
   guiding the spring biased knife holder arm assembly by rollers thereon biased against a guide on the positioner during rotation of the rotary actuator so the knife held by the arm moves in a nonround path to cut through the nonround portion of the container within a cutting groove thereof and thereby trim a scrap piece from the container; and
   holding the scrap piece upon trimming thereof from the container.

* * * * *

UNITED STATES PATENT AND TRADEMARK OFFICE
CERTIFICATE OF CORRECTION

PATENT NO. : 7,000,512 B2
DATED : February 21, 2006
INVENTOR(S) : Richard L. Dunlap et al.

It is certified that error appears in the above-identified patent and that said Letters Patent is hereby corrected as shown below:

Column 8,
Line 13, delete "biase" and insert -- biaser --.
Line 38, delete "toward" and insert -- to hold --.

Signed and Sealed this

Second Day of May, 2006

JON W. DUDAS
*Director of the United States Patent and Trademark Office*